(12) United States Patent
Lee

(10) Patent No.: US 12,002,056 B2
(45) Date of Patent: Jun. 4, 2024

(54) SYSTEMS AND METHODS FOR USE IN PROVISIONING DATA

(71) Applicant: MASTERCARD INTERNATIONAL INCORPORATED, Purchase, NY (US)

(72) Inventor: Charles Sangwon Lee, Briarcliff Manor, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 368 days.

(21) Appl. No.: 17/067,273

(22) Filed: Oct. 9, 2020

(65) Prior Publication Data

US 2021/0110400 A1 Apr. 15, 2021

Related U.S. Application Data

(60) Provisional application No. 62/914,085, filed on Oct. 11, 2019.

(51) Int. Cl.
*G06Q 20/40* (2012.01)
*G06Q 20/42* (2012.01)
*H04L 67/125* (2022.01)

(52) U.S. Cl.
CPC ... *G06Q 20/4097* (2013.01); *G06Q 20/40155* (2020.05); *G06Q 20/42* (2013.01); *H04L 67/125* (2013.01)

(58) Field of Classification Search
CPC ......... G06Q 20/4097; G06Q 20/40155; G06Q 20/42; G06Q 20/10; G06Q 20/202; G06Q 20/204; G06Q 20/326; G06Q 20/34; G06Q 20/405; G06Q 20/425; H04L 67/125; H04L 67/306
USPC .......................................................... 705/75
See application file for complete search history.

(56) References Cited

U.S. PATENT DOCUMENTS

| | | | |
|---|---|---|---|
| 8,655,719 B1 * | 2/2014 | Li | G06Q 30/0641 |
| | | | 705/14.1 |
| 10,607,219 B2 * | 3/2020 | Ciurea | G06Q 20/40 |
| 11,756,080 B1 * | 9/2023 | Viswanath | H04L 63/0428 |
| | | | 705/15 |
| 2014/0040134 A1 * | 2/2014 | Ciurea | G06Q 20/383 |
| | | | 705/44 |

(Continued)

*Primary Examiner* — Zeshan Qayyum
(74) *Attorney, Agent, or Firm* — Harness, Dickey & Pierce, P.L.C.

(57) ABSTRACT

Systems and methods are provided for provisioning data based on network messaging. One exemplary method includes passing, by a network computing device, a message to an institution where the message includes an account identifier for an account of a user and data of a first party. The data of the first party includes a code associated with a category of the first party and/or an identifier of the first party. The method also includes detecting, by a computing device, the message based on inclusion of the account identifier in the message and retrieving a control for the user based on the account identifier. The method then includes identifying, by the computing device, data for the user to be shared with the first party based on the data of the first party satisfying the control and sharing the identified data with the first party apart from the network computing device.

12 Claims, 3 Drawing Sheets

(56) References Cited

U.S. PATENT DOCUMENTS

2016/0283933 A1\* 9/2016 Orlando ............... G06Q 20/204
2020/0118110 A1\* 4/2020 Coverstone ........ G06Q 20/3224

\* cited by examiner

SYSTEMS AND METHODS FOR USE IN PROVISIONING DATA

CROSS-REFERENCE TO RELATED APPLICATION

This application claims the benefit of, and priority to, U.S. Provisional Application No. 62/914,085 filed on Oct. 11, 2019. The entire disclosure of the above application is incorporated herein by reference.

FIELD

The present disclosure generally relates to systems and methods for use in provisioning data, related to first parties, to second parties, via a first network, based on interactions between the first parties and the second parties via a second, different network.

BACKGROUND

This section provides background information related to the present disclosure which is not necessarily prior art.

Users are known to interact with various entities through accounts issued to the users. Payment accounts, for example, may be leveraged to permit users to purchase products, whereby funds associated with the payment accounts (e.g., deposited funds, credits, etc.) are paid to the merchants in exchange for the products. What's more, some interactions with the accounts may also be related to or may implicate other accounts. In the example above, a loyalty account may be associated with the user, whereby the user earns loyalty points into the loyalty account for purchases at the merchant using his/her payment account. Often, each of the accounts involved are specific to the users involved in the interactions, whereby the accounts are setup or issued based on identifying information about the users such as, for example, their names, mailing addresses, email addresses, phone numbers, birthdates, etc.

DRAWINGS

The drawings described herein are for illustrative purposes only of selected embodiments and not all possible implementations, and are not intended to limit the scope of the present disclosure.

Figure 1:
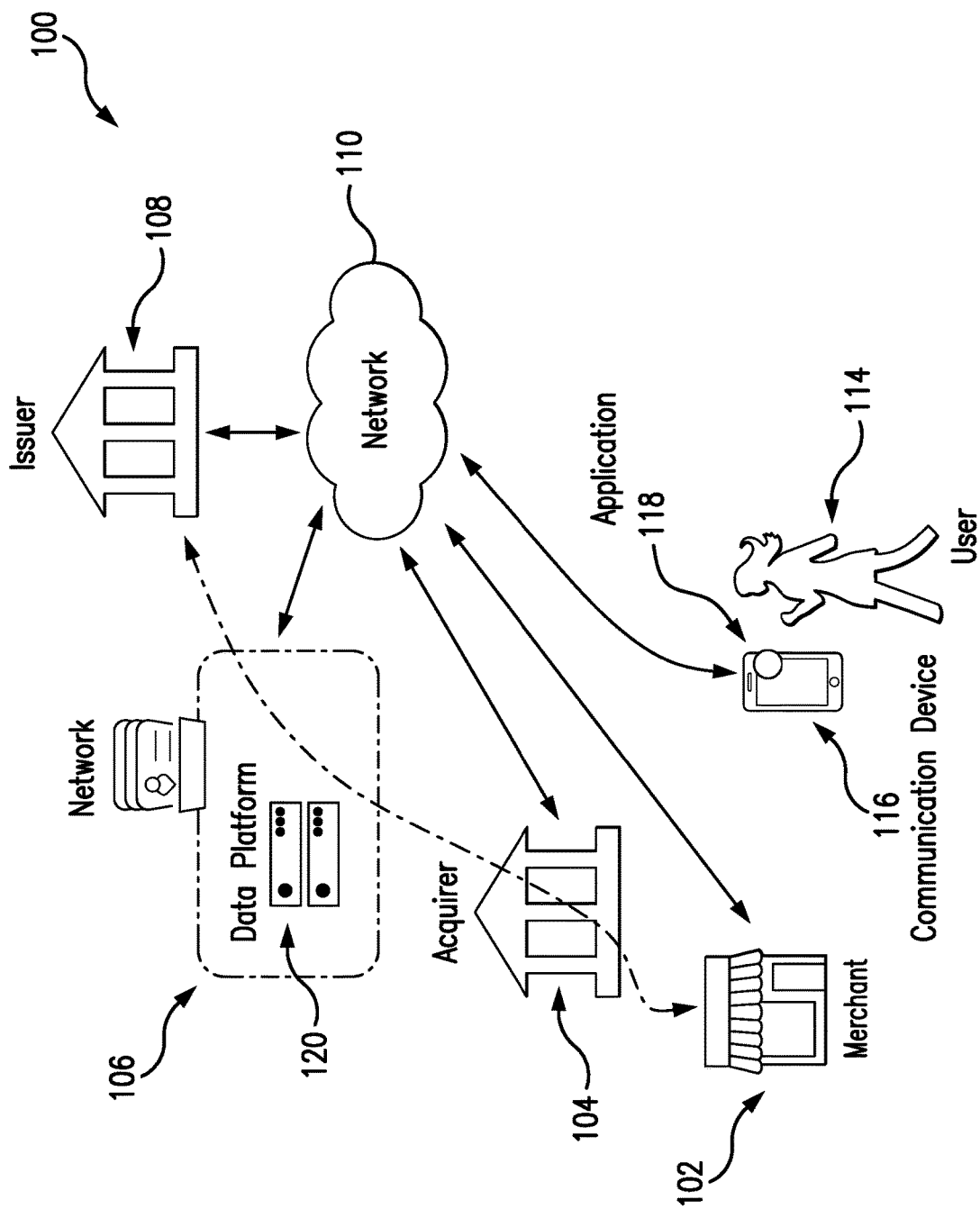
Figure 2:
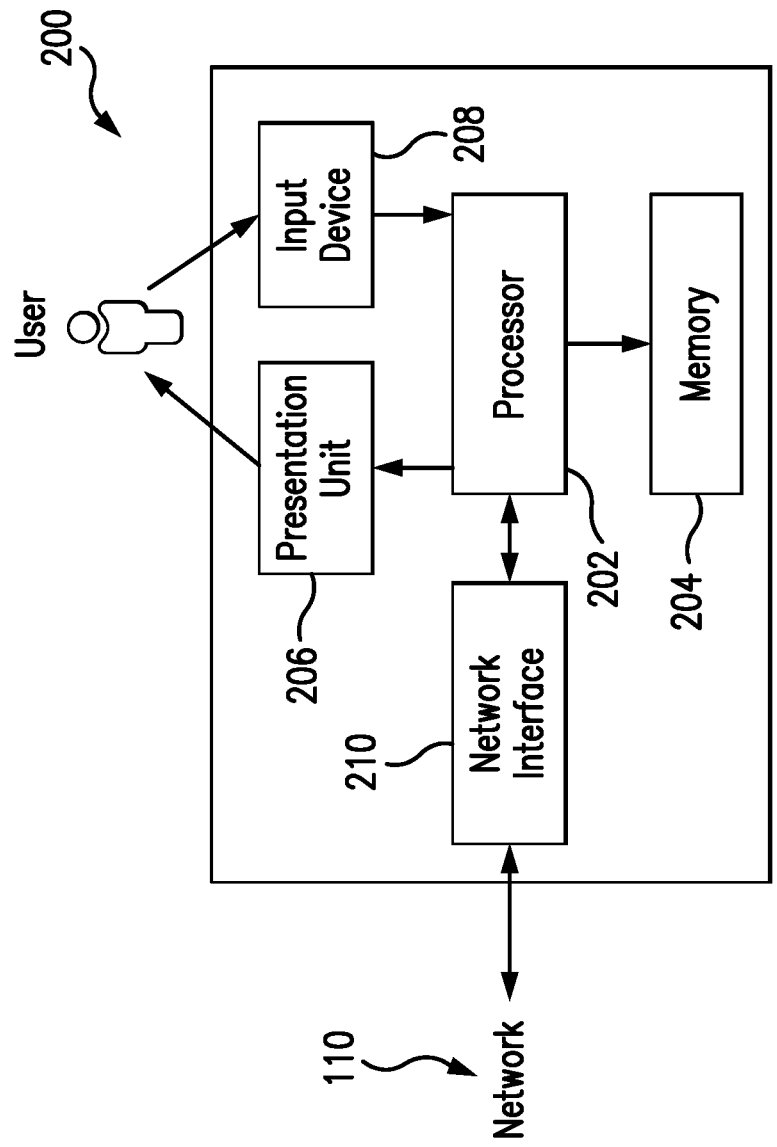
Figure 3:
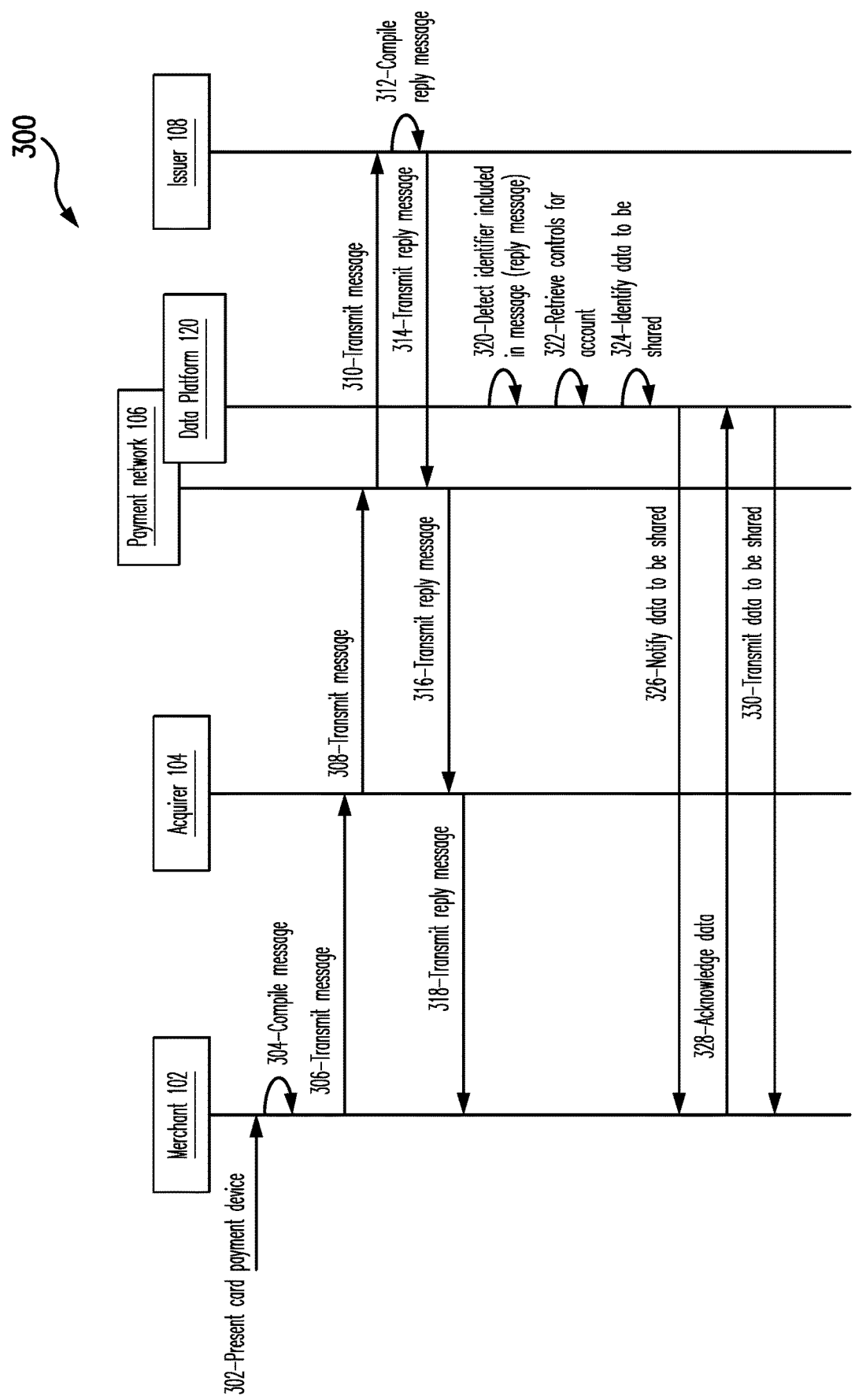

FIG. 1 illustrates an exemplary system of the present disclosure suitable for use in provisioning data related to first parties to second parties, via a first network, based on interactions involving the first and second parties in a second network;

FIG. 2 is a block diagram of a computing device that may be used in the exemplary system of FIG. 1; and FIG. 3 is a flow diagram of an exemplary method, which may be implemented in connection with the system of FIG. 1, for provisioning data related to a first party to a second party, via a first network, based on a network exchange between the first party and the second party via a second, different network.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Data is often shared between parties for one or more reasons. When data is shared, one party generally initiates the sharing of the data, for example, by filling out a form or application for a desired service or product (e.g., for a loyalty program or a line of credit, etc.). However, the manual process of entering the data to the form or application may be laborious and error prone. More recently, the sharing of such data may be done electronically whereby some data may be automatically retrieved. But even then, a large portion of the data may still need to be included in the form or application manually. What's more, such electronic sharing of the data also makes it difficult to set permissions defining which data (e.g., as may be retrieved from a repository, etc.) should actually be shared.

Uniquely, the systems and methods herein permit data to be shared, as defined by a first user, with a second user based on a payment account interaction between the first user and the second user. In particular, the first user may associate a variety of data with a payment account, such as, for example, his/her name, mailing address, government ID number, mobile phone number, health data (or corresponding records), prescription information, allergy information, fitness data, etc. In addition, the first user may also define controls for the data, indicating, for example, how, when, and with whom the data may be shared (e.g., based on a party with whom the data is to be shared, based on a category of the data, based on a time/date of the sharing (or in general), etc.). Then, once the data is received, stored and associated with the payment account (and the controls are implemented), the first party may make a purchase with a second party using the payment account or initiate different payment account activity with the second party using the account, via a payment network, whereby an entity associated with the payment account (e.g., the payment network, an issuer of the user's account, etc.) identifies the activity and transmits, to the second party involved in the activity, the data of the first party (as associated with the payment account) as defined by the controls, outside of the payment network (e.g., outside of or apart from conventional rails of the payment network, etc.). In this manner, the data associated with the first party is shared with the second party based on the controls defined by the first party (apart from the payment network) (and in response to the activity with the second party involving the payment account), whereby the data may be used in connection with the activity or otherwise by the second party.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, the manner and type of data to be shared, the parties involved in the sharing of the data, privacy rules and regulations, etc.

In the illustrated embodiment, the system 100 generally includes a merchant 102, an acquirer 104, a payment network 106, and an issuer 108 configured to issue payment accounts (or other accounts) to consumers, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between the merchants and one or more consumers (e.g., user 114, etc.), etc.

In general herein, the merchant 102 offers products (e.g., goods, services, etc.) for sale to consumers, including to the user 114, etc. The merchant 102 may offer products for sale through physical locations or through virtual locations (e.g., websites, network-based applications, etc.), etc. As such, the user 114, for example, is permitted to browse the physical locations or the virtual locations and, when appropriate, select one or more products for purchase. The merchant 102 may be otherwise in other embodiments, whereby the merchant 102 does not offer products or services for sale. As such, the merchant 102 may more generally be referred to herein as a party or entity (in other words, reference to the merchant 102 herein should not be considered limiting in the application of the present disclosure).

The user 114 (e.g., a party herein, etc.) in the system 100 is associated with a payment account issued by the issuer 108 (e.g., a data sharing payment account, etc.). The payment account may be a credit account, a debit account, or other suitable type of account for use as described herein. The user 114 then has the option to use one or more different types of payment devices to convey, for example, payment account credential(s) associated with the payment account to the merchant 102, for example, in connection with purchase transactions at the merchant 102. For example, the user 114 may present a card payment device (e.g., a credit card, etc.) to the merchant 102 (to convey such credential(s)) when purchasing a product, whereby a primary account number (PAN), expiration date, and name of the user 114, etc. is embossed on the card payment device (as is conventional). Alternatively, the user 114 may present a digital wallet to convey the same or similar data to the merchant 102.

In connection therewith, the merchant 102 is configured to read the card payment device (associated with the user's payment account) (or other digital wallet) (to receive, retrieve, obtain, etc. the payment account credential(s) therefrom) and, as is conventional, communicate an authorization message (and, more specifically, an authorization request) to the acquirer 104 via the network 110 (along the "payment rails") (e.g., as processed through BankNet operated by Mastercard®, as processed through VisaNet operated by Visa®, as processed through other suitable networks, etc.), generally consistent with the dashed, arrowed path in FIG. 1 (extending between the merchant 102, the acquirer 104, the payment network 106, and the issuer 108). The authorization message may include, for example, the PAN for the user's payment account and an amount of the purchase, a merchant name, merchant identifier, a merchant address or location, a date/time, and other suitable information specific to the transaction, the user 114 and/or the merchant 102, etc. The acquirer 104, in turn, is configured to communicate the authorization message with the issuer 108, through the payment network 106 (via the network 110), for authorization of the transaction (again, as indicated by the dashed, arrowed line in FIG. 1). The issuer 108 is configured to then determine if the user's payment account is in good standing and if sufficient credit/funds to complete the transaction is associated with the payment account. If the issuer 108 approves/accepts the transaction, the issuer 108 is configured to compile and transmit an authorization message (and, more specifically, an authorization reply) back to the merchant 102 (via the acquirer 104 and the payment network 106) authorizing the transaction. The merchant 102, in turn, continues toward completing the transaction. Meanwhile, the issuer 108 is configured to debit or limit the credit associated with the payment account by the amount of the transaction. And, the transaction is later cleared and settled by and between the merchant 102 and the acquirer 104 (in accordance with a settlement arrangement, etc.), and by and between the acquirer 104 and the issuer 108 (in accordance with another settlement arrangement, etc.).

Conversely, if the issuer 108 declines the transaction, the issuer 108 is configured to compile and transmit an authorization message (more specifically, an authorization reply) back to the merchant 102 declining the transaction, whereupon the merchant 102 is able to stop the transaction or seek an alternate form of payment.

It should be appreciated that the merchant 102 may obtain, receive, retrieve, etc. the payment account credential(s) for the user's payment account in other manners in other embodiments (e.g., other than directly from a card payment device as described above, etc.). For instance, the user 114 may communicate the credential(s) to the merchant 102 directly (e.g., verbally and independent of a card payment device, etc.). Or, the credential(s) may be obtained from a virtual wallet associated with the user 114, etc.

What's more, the interaction by the user 114 with the merchant 102 may be for purposes other than a purchase, such as an inquiry (e.g., a balance inquiry, another account inquiry, etc.), a status check, or other activity relating to the user's payment account, etc. In general, though, the message(s) associated with the interaction with still be generally consistent with the above description (albeit not directed to authorization) (whereby the message(s) is(are) generated and transmitted along the payment rails associated with the payment network 106). As such, the interaction by the user 114 with the merchant 102 (and/or the message(s) associated with the interaction) may be viewed as a trigger (or triggers) for sharing data as described herein.

In the illustrated embodiment, the messaging associated with the authorization of the transaction, or the other activity of the payment account, is transmitted as ISO 8583 messages, along the payment rails defined by the payment network 106 (e.g., along the dashed arrowed line in FIG. 1 by way of the particular ISO 8583 messages, etc.). It should be appreciated that other payment messaging standards (e.g., other ISO-based messages or other suitable categories of ISO messages, other messages in general that are not ISO-based, or otherwise, etc.) may be employed between the merchant 102, the acquirer 104, the payment network 106 and the issuer 108 in other embodiments, as part of the payment rails defined by the payment network 106 (e.g., as processed through BankNet operated by Mastercard®, as processed through VisaNet operated by Visa®, as processed through other suitable networks, etc.), but with such messaging still including specific payment-related or transfer-related or inquiry-related messaging.

Transaction data is generated, collected, and stored as part of the above interactions among the merchant 102, the acquirer 104, the payment network 106, the issuer 108, and the user 114 (regarding the example transaction as well as other transactions). The transaction data represents at least a plurality of transactions, e.g., completed transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104, and/or the issuer 108 may store the transaction data, or part thereof, in a data structure. Transaction data may include, for example, payment account numbers (e.g., PANs, etc.), amounts of transactions, merchant IDs, merchant category codes (MCCs), dates/times of transactions, products purchased and related descriptions or identifiers, products refunded, etc. It should be appreciated that more or less information related to transactions, as part of either authorization and/or clearing and/or settling, may be included in transaction data and stored within the system 100, at the merchant 102, the acquirer 104, the payment network 106, and/or the issuer 108. Further, transaction data, unrelated to a particular payment account, may be collected by a variety of techniques, and similarly stored within the system 100.

With continued reference to FIG. 1, the user 114 is further associated with a communication device 116, which may include, for example, a smartphone, a tablet, a personal computer, etc. The communication device 116 includes a network-based application 118, which specifically configures the communication device 116 to operate as described herein. In one exemplary embodiment, the application 118 is associated with the issuer 108, whereby it is disseminated by the issuer 108 as a mechanism for providing access to the user's payment account (e.g., to view balances and rewards, make payments, request customer support, etc.). In connection therewith, the communication device 116 is configured, by the application 118, to authenticate the user 114 prior to permitting at least certain interactions between the application 118 and the user 114, etc. While the system 100 is described with reference to the application 118, it should be appreciated that the communication device 116 and/or a data platform 120 of the system 100, described below, may interact via a website (rather than the network-based application 118) to operate as described herein, in other system embodiments.

That said, the system 100 includes the data platform 120, which is, at least in part, a backend for the network-based application 118. The data platform 120 should be understood to be one or more computing devices, which are configured to perform the operations described herein. In connection therewith, the data platform 120 may be a stand-alone part of the system 100, or it may be incorporated into or associated with the payment network 106 (in whole or in part), as indicated by the dotted box in FIG. 1. It should be appreciated that the data platform 120 may further (or alternatively) be associated with and/or incorporated into the issuer 108 or otherwise in the system 100 in other embodiments.

In this exemplary embodiment, the data platform 120 is configured to receive data related to the user 114 (e.g., from the user 114 or from other sources of such data, etc.), including, for example, personal identifying data, etc. (e.g., based on permission from the user 114, etc.). For example, the user 114 may register with the data platform 120 and, in connection with such registration, the user 114 may provide the data to the data platform 120 and/or may direct other entities in possession of such data to provide the same to the data platform 120 (or allow the data platform 120 to retrieve such data). The data may include, without limitation, a name of the user 114, a mailing address, a phone number, an email address, a birthdate, a government ID number (e.g., a social security number, an Aadhaar number, a driver's license number, a passport number, etc.), a gender, a place of birth, a race, employment data, health data (or corresponding records), prescription information, allergy information, fitness data, etc. The data platform 120 is configured to store the data in a data structure and identify (or associate) the data to the user 114, for example, by the PAN associated with the payment account issued to the user 114 by the issuer 108. In addition, in some embodiments, the data platform 120 may also include offers and/or financial data for (or associated with) the user 114. In connection therewith, and as described in more detail hereinafter, such offers and/or financial data may subsequently be shared with the merchant 102, for example, in accordance with the description herein (e.g., where an offer may be provided to the merchant 102 to unlock a free item or to print a coupon from the merchant, where financial data (such as a credit score, etc.) may be provided to the merchant 102 and leveraged for at a point-of-sale (POS) terminal for POS financing (e.g., as a real-time line of credit, etc.), etc.).

In addition, the data platform 120 is configured to receive, from the user 114, via the application 118 in the communication device 116, one or more controls associated with the data. In particular, as part of such controls, the user 114 registers for data sharing through the application 118. In connection therewith, the user 114 accesses the application 118, at the communication device 116, which requires, in this exemplary embodiment, the user 114 to be authenticated (e.g., via a PIN, passcode, biometric, etc.). Once authenticated, the communication device 116 is configured, by the application 118, to solicit inputs to define the user's data into sets (e.g., as defined or customized by the user 114, as predefined sets, etc.) and associate controls for the sets. The user 114, in turn, provides the inputs, whereby the controls are generated for the data. The communication device 116 is configured, by the application 118, to then transmit the controls to the data platform 120, whereupon the data platform 120 is configured to store the controls in association with the account of the user 114 (e.g., in a data structure associated with the user 114, etc.) and the data corresponding thereto (e.g., as identified to the PAN for the user's payment account where the data may already be arranged in such sets, etc.).

The controls generated via the application 118 may specify who is to receive what data, when the data is to be shared, what data set is to be shared and the conditions of sharing the data, etc. Table 1 illustrates multiple exemplary controls (i.e., controls #1-#4) that may be associated with the user's data. In this example, the data is generally identified by one or more particular sets as selected from (without limitation): a contact data set (e.g., including the user's name, phone number, email address, etc.), a biographical data set (e.g., including the user's name, birthdate, birth place, gender, race, height, weight, etc.), a mail data set (e.g., including the user's mailing address, etc.), a government ID data set (e.g., including the user's contact data, mail data, Aadhaar number, driver's license number, and social security number, etc.), etc. Certain ones of the data sets will include other data in various embodiment. That said, it should be appreciated that various other divisions of data into sets may be provided in other system embodiments for other controls.

TABLE 1

| Control | Who | Why/Reason | Data Set(s) Implicated | Acceptable Use |
|---|---|---|---|---|
| 1 | MCC = 3005 (British Airlines) | Purchase | Contact data, mail data | Shared with other third-parties |
| 2 | Merchant 102 | Purchase | Government ID data | Temporarily |

TABLE 1-continued

| Control | Who | Why/Reason | Data Set(s) Implicated | Acceptable Use |
|---|---|---|---|---|
| 3 | MCC 8062 (Hospitals) | ANY | Contact data, government ID, biographical data, mail data | Stored for one year |
| 4 | ABC Merchant | Balance Inquiry | Contact data, mail data | Stored indefinitely |

It should be appreciated that the controls generated and/or the inputs provided by the user 114 related to the controls may be selected, via the application 118, by the user 114, at the communication device 116, based on form controls, suggested controls, manually created controls, or otherwise (e.g., from drop-down menus, via a search bar (through which the user 114 can search for one or more specific merchants, etc.), via radio buttons (e.g., for multiple MCC selections, etc.), etc.). For instance, in accessing the application 118, and selecting to provide such controls, the application 118 may cause an interface to display to the user 114, at the communication device 116, through which the user 114 can then provide inputs regarding the controls. Alternatively, the interface may be provided to the user 114 via a web-based application, via another mobile application at the communication device 116, etc. Further, in various embodiments, the interface may also provide (or allow) the user 114 to view all information associated with the user 114 and stored at the data platform 120, update (or otherwise manage) certain information stored at the data platform 120, view (or otherwise manage or edit) sets of data stored at the data platform 120, view (or otherwise manage or edit) data to be shared with selected merchants, etc.

Subsequently in this exemplary embodiment, as suggested above, the data platform 120 is configured to monitor authorization requests or other messages sent from the acquirer 104 to the issuer 108, as the messaging passes through the payment network 106 (along the payment rails thereof). When a message is associated with the PAN for the user 114, the data platform 120 is configured to read the message (in whole or in part (e.g., a transaction identifier from the message, a MCC from the message, a PAN from the message, etc.)) (whereby the data platform 120 understands the content of the message, but the message is generally unencumbered from being transmitted to the issuer 108 along the payment rails) and to check the message against the controls for the PAN, such as included in Table 1. In at least one embodiment, a BIN (or multiple BINs) is generally associated with data share payment accounts, whereby the data platform 120 is configured to initially identify the user's payment account (because it is such a data share payment account) by the BIN prior to checking for controls based on the particular PAN for the user's payment account.

When a control is satisfied or implicated (or triggered) by the underlying transaction, the data platform 120 is configured to retrieve the data identified for the control (from a data structure at the data platform 120 associated with the user 114, etc.) and to transmit the retrieved data to the merchant identified in the message (and, potentially, identified in the control when the data is to be shared with more than one merchant, etc.), such as, for example, the merchant 102 in the above example transaction for control #2. In this exemplary embodiment, the data is transmitted to the merchant 102 via an application programing interface (API) (e.g., by means apart from the rails of the payment network 106 (such as the API, a SMS message, an email message, etc.) (e.g., such that the data does not flow through, go through, or pass through the payment network 106; such that the data is transmitted to the merchant 102 by the data platform 120 in a manner that is independent of the payment network 106; etc.), etc.). The data may further include a transaction ID for the message being transmitted along the payment rails (as captured from the message), whereby the merchant 102 is permitted to match the received data to the message transmitted through the payment network 106 to the issuer 108.

In connection therewith, the merchant 102 is configured to receive the data (via the message transmitted to the merchant 102 apart from the payment rails of the payment network 106) and to act accordingly. More specifically, the merchant 102 may rely on the received data to identify the corresponding transaction to a loyalty account (e.g., to permit an award of loyalty points/miles, etc.), open a new loyalty account, identify a shipping address for the purchase, fund the transaction (if not already done so), apply for financial assistance for the transaction at the merchant 102 (e.g., POS financing, a secured or unsecured credit line, a bill me later option, etc.), and other acts premised on the data about the user 114 received from the data platform 120 (via the message sent apart from the rails of the payment network 106).

While one merchant 102, one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 is not limited to only one user 114, as numerous consumers will likely be included in various implementations of the systems and methods described herein. As such, the system 100 may accommodate multiple transactions similar to the ones described herein.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, the merchant 102, the acquirer 104, the payment network 106, the issuer 108, and the data platform 120 may each include, or may be implemented in, a computing device consistent with computing device 200, coupled to (and in communication with) the network 110. In addition, the communication device 116 may be considered a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, personal identifying data, sharing controls, transaction data, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby in connection with performing such operations (based on the instructions) the computing device 200 may be transformed into a special-purpose computing device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., personal identifying data, control options, etc.), visually, for example, to a user of the computing device 200 (e.g., the user 114, a user associated with the merchant 102, etc.), etc. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) such as, for example, inputs by the user 114 to define a sharing control or as otherwise described herein, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), a near field communication reader, another computing device, and/or an audio input device, etc. In various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, etc.), a mobile network adapter, or other device capable of communicating to one or more different networks, including the network 110. In some exemplary embodiments, the computing device 200 may include the processor 202 and one or more network interfaces incorporated into or with the processor 202.

FIG. 3 illustrates an exemplary method 300 for use in provisioning data related to a first party to a second party, via a first network, based on a network exchange between the first party and the second party via a second, different network. The exemplary method 300 is described with reference to the system 100, and as implemented generally in the data platform 120. The method 300 is also described with reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset, it is assumed that the user 114 is registered with the data platform 120, whereby personal identifying data and one or more controls are stored in (and populated to) a data structure (e.g., in memory 204, etc.) of the data platform 120 (as generally described above). In connection therewith, the data is then also linked to the user 114, for example, by way of the PAN for the user's payment account, etc.

Thereafter in the method 300, the user 114 presents his/her card payment device at the merchant 102, at 302 (or otherwise presents one or more credentials for his/her payment account to the merchant 102 (e.g., independent of the card payment device, etc.) (e.g., by dipping the card payment device in a POS terminal at the merchant 102, by automatic detection of a digital wallet by the merchant 102 via Bluetooth Low Energy (BLE) or WiFi, etc.). The use of the card payment device, in this example, may involve a purchase transaction, a balance check, a load request, or other interaction with the merchant 102 regarding the user's payment account, which relies on the messaging described herein. In at least one embodiment, the card payment device may be presented, by the user 114, to simply check-in at the merchant 102 (and cause a check message to be transmitted by the merchant 102 to the payment network 106 (and/or issuer 108) via the payment rails of the payment network 106 (through an ISO message, etc.)). It should be appreciated that, in this exemplary embodiment, the card payment device may include a physical card or a digital wallet entry (e.g., included in the communication device 116, etc.), whereby either is presented by swiping, scanning (e.g., QR code(s), etc.), tapping (e.g., NFC, BLE, etc.), etc. the card payment device at the merchant 102, via a point of interaction (POI) terminal.

In response, at 304, the merchant 102 compiles a message (e.g., a pre-authorization request, an authorization request, a balance check message, a financial message, another message not directed to a purchase, etc.). The message includes the PAN for the user's payment account, an amount (if appropriate), merchant data for the merchant 102 (e.g., merchant name, merchant address, merchant identifier, merchant category code (MCC), etc.), acquirer data, transaction data (e.g., a transaction identifier, a time/date, etc.), a type of authentication, etc. The merchant 102 then transmits, at 306, the message to the acquirer 104 (e.g., as an ISO 8583 message, etc.). And, the acquirer 104 transmits, at 308, the message, or part thereof, to the payment network 106, and the payment network 106 transmits, at 310, the message, or part thereof, to the issuer 108 (all of which are along the payment rails of the payment network 106).

Upon receipt of the message, the issuer 108 determines a proper response to the message (e.g., depending on the type of message, etc.) (e.g., an authorization reply (including an approve or decline for the transaction), a balance statement or amount, a confirmation, etc.) and compiles the reply message, at 312. At 314, the issuer 108 transmits the reply message to the payment network 106 (back along the payment rails of the payment network 106). And, the payment network 106 transmits, at 316, the reply message, or part thereof, to the acquirer 104, and the acquirer 104 transmits, at 318, the reply message, or part thereof, to the merchant 102 (all of which, again, are along the payment rails of the payment network 106).

In this exemplary embodiment, the data platform 120, as part of the payment network 106, detects, at 320, an identifier included in the original message (received at the payment network 106 at 308) or the reply message (received at the payment network at 316) as being associated with a registered account. The identifier may include, for example, the PAN for the payment account or a part thereof (e.g., a BIN, etc.). For example, data sharing payment accounts (as used herein) may be assigned a unique BIN, whereby detecting the BIN indicates that the payment account is registered or at least capable of registering for data sharing from the data platform 120. Upon detecting the identifier, then, the data platform 120 retrieves, at 322, the one or more controls associated therewith for data sharing from a data structure (e.g., in memory 204, etc.) of the data platform 120. It should be appreciated that the identifier may be other than the PAN in other embodiments. For instance, the identifier may be a specific identifier (e.g., a value associated with one or more pieces of data of the user 114, a random code, etc.) assigned to the user 114 to be used in connection with his/her payment account, etc.

Next, at 324, the data platform 120 identifies the data from the data structure related to the user 114 that is to be shared with the merchant 102, based on the retrieved one or more controls. As such, certain data sets are included in the identified data for sharing (based on the controls), potentially, while other data sets are excluded from the identified data. Specifically, as shown in Table 1, as an example, the merchant 102 is associated with a control, whereby government ID data is to be shared with the merchant 102, i.e., Control #2. As such, at 324, the data platform 120, based on that control, identifies the government ID data of the user 114 to be shared with the merchant 102. In another example, the data set(s) may be identified to a particular category of merchant, such as Control #1 in Table 1, which identifies contact and mailing data sets to share when the merchant is associated with the MCC 3005 (which, then, may be shared with the merchant 102 and multiple other merchants associated with MCC 3005, etc.). It should be appreciated that the data set(s) shared may also include data that includes a time of day, time of the week, type or category of merchant, type of authentication at the purchase (e.g., PIN, biometric, none, etc.), or various other aspects of the underlying transaction that triggered the sharing. In at least one example, a control may require a balance check message, in which the user 114 has authenticated via a biometric, to cause a government ID data set to be shared with the first party (e.g., the merchant 102).

It should be appreciated that the controls will either be satisfied or not based on at least a portion of the data included in the message or reply message communicated through the payment network 106, along the payment rails (and read by the data platform 120).

When the data is identified, optionally, the data platform 120 notifies, at 326, the merchant 102 of the data to be shared. The notification may include a transaction identifier, to permit the merchant 102 to identify the data to a specific transaction (broadly, a message) and a description of the data to be shared (e.g., a name, an address, a phone number, a social security number, etc.). Such notification may be transmitted along the payment rails of the payment network 106, or apart therefrom (e.g., via a SMS message, an email message, an API, etc.). In response, the merchant 102 acknowledges the data, at 328, which includes either a confirmation to send the data to be shared or a decline (again, either along the payment rails of the payment network 106, or apart therefrom). When declined, the data platform 120 ends the process. Conversely, when confirmed, the data platform 120 transmits, at 330, the data to be shared with the merchant 102. In doing so, the data is transmitted to the merchant 102 by a communication means (e.g., via an API, a SMS message, an email message, etc.) that is not through the payment network 106, the acquirer 104, and/or the issuer 108 (e.g., not along the payment rails of the payment network 106, etc.). Additionally, the data platform 120 may notify the user 114 (e.g., via an API, a SMS message, an email message, etc.) of the data to be shared (e.g., a description of the data to be shared (e.g., a name, an address, a phone number, a social security number, etc.), etc.), and may request (and/or require) authorization/confirmation from the user 114 to proceed with sharing the data (prior to notifying the merchant 102 and/or prior to actually transmitting the data to the merchant 102) (e.g., via a reply by the user 114 to the notification at the communication device 116, etc.).

Subsequently, the merchant 102 may employ the data in various acts. In one example, the merchant 102 may receive a mailing address form the data platform 120, and add the mailing address from the shared data to the transaction for the purchase of a product in order to direct shipment of the product and eliminate or limit the need for the user 114 to supply the mailing address (or other suitable data). In another example, the merchant 102 may include the shared data in an application for financing, including, without limitation, an application for a line of credit or a tab with the merchant 102 (e.g., a bill me later option, etc.). When acquired, the account may be employed to immediately fund a purchase at the merchant 102. In yet another example, the merchant 102 may use a loyalty account number from the data to award points/miles to the user 114, or even to apply for a loyalty account. It should be appreciated that in various embodiments, when an account or financial option is applied for and/or approved, the merchant 102 may further submit the data associated with the account (e.g., the loyalty account, the line or credit, the bill me later account, etc.) back to the data platform 120, whereby it may be stored as part of (or as an update to, etc.) the data profile of the user 114 (for later sharing).

In another example, the data may be used by the merchant 102 to "check-in" the user 114 at the merchant location, whereby the data shared from the data platform 120 may include a name, an address, a phone number, a MAC address of the user's communication device 116, application ID for the application 118 at the communication device 116, an email address, and payment account credentials, etc. In so doing, the data may allow the user 114 to further automatically check-out from the merchant 102 following completion of shopping, etc. In such an example, the merchant 102 may use the received data to solicit the user 114 to enroll in a loyalty or reward account offered by the merchant 102 and/or to transmit offers to the user 114, at the communication device 116, via SMS messages, email messages, or via the application 118, for example. As the user 114 shops at the merchant 102, then, the user may scan items through a mobile application at the communication device 116, whereby the scanned items are collected in a virtual shopping cart. Alternatively, the merchant 102 may use camera vision technology at the merchant 102 to automatically place items into a virtual shopping cart for the user 114 as the user 114 selects the items. In either case, when the user 114 exits the merchant location, as understood because the merchant 102 detects the communication device 116 by the MAC address and/or application ID associated therewith, as shared from the data platform 120, the merchant 102 automatically completes a transaction for the products selected by the user 114 and included in the virtual shopping cart (e.g., the user 114 is able to automatically check-out, etc.). What's more, the transaction is assigned to the loyalty and/or reward account of the user 114, if he/she applied.

In another example, the data stored at the data platform 120 may include offers and/or financial data for (or associated with) the user 114. In connection therewith, upon identifying a message associated with the user 114, the data platform 120 may then identify the appropriate data for sharing with the merchant 102 (or other party) identified in the message. Then, additionally, the data platform 120 may also identify (depending on one or more controls associated with the user 114) that the offers and/or financial data associated with the user 114 should also be shared with the merchant 102, for example (e.g., where an offer may be provided to the merchant 102 to unlock a free item or to print a coupon from the merchant, where financial data (such as a credit score, etc.) may be provided to the merchant 102 and leveraged for at a point-of-sale (POS) terminal for POS financing (e.g., as a real-time line of credit, etc.), etc.).

In yet another example, the data received by the merchant 102 (e.g., a hotel, etc.) may be used to permit access to a room or location, etc. For instance, the user 114 may decide to check into a merchant hotel. In so doing, the user 114 may present a credit card to the merchant hotel for securing a room, whereby the hotel merchant may store the consumer's card account on file for later checkout. In this example, then, the user 114 may use his/her credit card to access the room. In particular, a door of the room may include a point-of-interest (POI) device attached thereto (specifically, to a lock of the door, etc.). Additionally, the POI device may be connected to (or in communication with) the payment network 106. As such, when the user 114 taps, dips, inserts, etc. his/her credit card on/in the POI device at the door to access the room, the payment network 106 receives a message (e.g., a status message, a check-in message, etc.) indicating the interaction between the user 114 and the room (via the POI device and along the payment rails of the payment network 106). As describe above, the data platform 120 may then detect such message (e.g., based on a BIN to which the user's account is associated, the PAN for the users account, etc.) and notify the hotel merchant that the user's credit card was used to access the hotel room door (via an API, an SMS message, an email message, or otherwise apart from the payment network 106 as described herein). And, in turn, the hotel merchant may take action to unlock the hotel room door remotely in response to the message (and in response to matching the data received from the data platform 120 to the account on file for the user 114). Further, in some implementations, the data platform 120 may also provide additional data associated with the user 114 to the hotel merchant (as described above), whereby the hotel merchant may then provide additional services and/or products to the user 114 based on the received data.

In still further examples, the data stored at the data platform 120 for the user may be used by the payment network 106 and/or data platform 120, for example, as a basis to provide additional layers of products or services to the user 114 for his/her payment account, in addition to (or on top of) those already available to the user 114. For example, a card product used by the user 114 in a transaction (as identified by the data platform 120 herein) may not offer price protection or travel insurance. Upon recognizing that such services are not provided, the payment network 106 and/or data platform 120 may then offer the additional services to the user 114 (e.g., based on contact information included in the data platform 120, etc.).

It should be appreciated that the merchant 102 may employ the shared data in a variety of other manners within the scope of the present disclosure, as the above examples are provided for illustration only and not as limitations of such applicability.

In view of the above, the systems and methods herein permit provisioning of data related to first parties to second parties, via a first network, based on interactions (or triggers) between the first parties and the second parties via a second, different network. In this manner, a physical card or digital card may be realized as a gateway or access point for the user's profile, or part thereof. As such, the friction between a user (e.g., as a first party, etc.) and other parties may be limited or eliminated, where the user is attempting to disclose personal identifying data to a party for one or more reasons. What's more, interaction(s) that trigger the sharing of the data may occur along rails of a payment network, while the actual sharing of the data may occur the data may be shared with the other parties by way of a communication that is different from and apart from the rails of the payment network (e.g., SMS messaging, email, etc.) and that is independent of the payment network itself. As such, the sharing of the data, once triggered, may not interfere with conventional traffic through the payment network.

The systems and methods herein also provide for flexibility in provisioning personal identifying data, as applicable to either online or in store interactions between the user and the party. Consequently, the systems and methods herein may be employed to permit the party to provide a financing for the user, whereby the party would not lose the purchase for the user's lack of available funds. What's more, the systems and methods herein may provide seamless checkout, whereby payment is coordinated through a card, and data associated with the purchase (e.g., shipping data, proof of age, etc.) is provided apart from the transaction to the party, thereby eliminating or limiting the data provided directly from the user to the party. That said, the systems and methods herein abide by certain controls, as defining limitation of the sharing of data, set by the users.

In some aspects of the present disclosure, a physical card is leveraged at a point of interaction (e.g., a POS terminal, etc.) to gain access to additional data about a user, and share the data back with a third-party, like a merchant. In particular, the user interacts with the POS terminal in a store with a physical card to make a purchase, whereby the transaction is processed as card network transaction (along payment rails of a payment network). In connection therewith, the card network detects or intercepts the PAN from the messaging for the transaction. The card network then links the PAN to a user "digital wallet" or data profile (at a data platform) that holds additional data about user (e.g., a name, mailing address, phone number, email address, birthdate, government ID number (e.g., social security number Aadhaar number, driver license number, passport number, etc.), gender, place of birth, race, employment data, etc.). The card network uses a backend API to pass the data from the digital wallet or user profile (along with a transaction identifier, potentially) back to the third-party. As such, the third-party links the in-store POS transaction to the consumer online profile for further analysis and action related to the user, as described above. In this manner, the personal identifying data is stored away from the card (except for the PAN, for example) and provided to the third party, by the card network (e.g., the data platform 120, etc.), in response to an interaction between the third party and the card (by way of communication apart from the payment rails of the card network).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) passing, by a network computing device, a message to an institution, the message including an account identifier for an account specific to a user and data associated with a first party, the data associated with the first party including at least one of a code associated with a category of the first party and/or an identifier of the first party; (b) in response to the message, detecting, by a computing device, the message based on inclusion of the account identifier in the message; (c) retrieving, by the computing device, at least one control associated with the user and included at the computing device, based on the account identifier; (d) identifying, by the computing device, data from a user profile for the user to be shared with the first party based on the data associated with the first party satisfying the at least one control, the data from the user profile including personal identifying data for the user; (e) sharing, by the computing device, the identified data with the first party, but apart from the network computing device; (f) notifying, by the computing device, the first party of the identified data to be shared based on the at least one control; and (g) generating, by the computing device, the user profile for the user.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for provisioning data based on network messaging, the method comprising:

passing, by a payment network, an authorization message along a first communication path through payment rails of the payment network, from a first party, through a first institution, to a second institution, the authorization message including an account identifier for an account specific to a user, a transaction identifier for a transaction between the first party and the user, and data associated with the first party, the data associated with the first party including at least one of a code associated with a category of the first party and/or an identifier of the first party;

detecting, by a data platform computing device of the payment network, the account identifier in the authorization message;

retrieving, by the data platform computing device, at least one control associated with the user and included in memory of the data platform computing device, based on the account identifier;

identifying, by the data platform computing device, data from a user profile for the user to be shared with the first party based on the data associated with the first party satisfying the at least one control, the data from the user profile including personal identifying data for the user;

notifying, by the data platform computing device, via the first communication path through the payment rails of the payment network, the first party of the identified data to be shared and the transaction identifier from the authorization message;

receiving, by the data platform computing device, via the first communication path through the payment rails of the payment network, from the first party, an acknowledgement of the identified data to be shared, the acknowledgement including a confirmation to send the data to be shared; and in response to the confirmation, sharing, by the data platform computing device, the identified data with the first party, along a second communication path, via an application programming interface (API) and apart from the first communication path through the payment rails of the payment network and apart from the first institution and the second institution.

2. The computer-implement method of claim 1, wherein the authorization message is consistent with the ISO 8583 standard.

3. The computer-implement method of claim 1, wherein the account identifier includes a primary account number (PAN) for the account specific to the user; and wherein the account includes a payment account.

4. The computer-implemented method of claim 1, wherein the data associated with the first party includes the code associated with the category of the first party;

wherein the code associated with the category of the first party includes a merchant category code (MCC); and wherein the at least one control includes a class of data to be shared based on the MCC of the first party.

5. The computer-implemented method of claim 1, wherein the identified data includes a set of data within the user profile and excludes a different set of data in the user profile.

6. The computer-implemented method of claim 1, further comprising generating, by the data platform computing device, the user profile for the user.

7. A system for provisioning data based on network messaging, the system comprising:

a payment network computing device; and a data platform computing device coupled in communication with the payment network computing device;

wherein the payment network computing device is configured to:

receive an authorization message along a first communication path through payment rails of the payment network, from a first party, through a first one of multiple financial institutions, the authorization message including data associated with a first party, a primary account number (PAN) for a payment account associated with a user, and a transaction identifier for a transaction between the first party and the user; and pass, along the communication path, the authorization to a second one of the financial institutions, which is associated with the payment account; and wherein the data platform computing device is configured to:

detect the authorization message based on the authorization message including the PAN;

retrieve at least one control for data associated with the user, based on the PAN;

identify data from a user profile associated with the user to be shared with the first party based on the data associated with the first party satisfying the at least one control, the data from the user profile including personal identifying data for the user;

notify, via the first communication path through the payment rails of the payment network, the first party of the identified data to be shared and the transaction identifier;

receive, from the first party, via the first communication path through the payment rails of the payment network, an acknowledgement of the identified data to be shared, the acknowledgement including a confirmation to send the data to be shared; and in response to the confirmation, share the identified data with the first party, along a second communication path, via an application programming interface (API) and apart from the first communication path through the payment rails of the payment network and apart from the first and second ones of the financial institutions.

8. The system of claim 7, wherein the authorization message includes a ISO 8583 message; and wherein the first one of the financial institutions includes an acquirer associated with the first party and the second one of the financial institutions includes an issuer of the payment account.

9. The system of claim 7, wherein the identified data includes a set of data within the user profile and excludes a different set of data in the user profile.

10. The system of claim 9, wherein the data platform computing device is further configured to generate the user profile for the user.

11. A non-transitory computer-readable storage medium including computer-executable instructions for provisioning data based on network messaging, which, when executed by a processor of a payment network, cause the processor to:

detect an authorization message along a first communication path through payment rails of the payment network, from a first party, through a first financial institution, to a second financial institution, based on a primary account number (PAN) included in the authorization message, the authorization message including data associated with the first party, a transaction identifier for a transaction between the first party and a user, and the PAN associated with a payment account of the user;

retrieve at least one control for data associated the user based on the PAN;

identify data from a user profile associated with the user to be shared with the first party based on the data associated with the first party satisfying the at least one control, the data from the user profile including personal identifying data for the user; user;

notify, via the first communication path through the payment rails of the payment network, the first party of the identified data to be shared and the transaction identifier;

receive, from the first party, via the first communication path through the payment rails of the payment network, an acknowledgement of the identified data to be shared, the acknowledgement including a confirmation to send the data to be shared; and in response to the confirmation, share the identified data with the first party along a second communication path, via an application programming interface (API) and apart from the first communication path, through the payment rails of the payment network, including the first financial institution.

12. The non-transitory computer-readable storage medium of claim 11, wherein the authorization message includes a ISO 8583 message; and wherein the first financial institution includes an acquirer associated with the first party, and wherein the second financial institution includes an issuer of the payment account.

* * * * *